Sept. 3, 1957  D. S. POOLE  2,804,937

AIR FILTER WITH ORDERLY ARRANGED FILAMENTS

Filed Oct. 21, 1953

AIR FLOW →     AIR FLOW →

*INVENTOR.*
DONALD S. POOLE

BY

*R. L. Miller*
ATTORNEY

United States Patent Office 2,804,937
Patented Sept. 3, 1957

2,804,937

AIR FILTER WITH ORDERLY ARRANGED FILAMENTS

Donald S. Poole, Akron, Ohio, assignor, by mesne assignments, to The Goodyear Tire & Rubber Company, a corporation of Ohio Application October 21, 1953, Serial No. 387,368

1 Claim. (Cl. 183—70)

This invention relates to an improved filter for the removal of dust particles from a gas passed therethrough and particularly to a gas filter having a filter medium made of a material capable of developing a electrostatic charge when a gas is passed thereover, and specifically to a gas filter having an improved filter medium comprising superposed layers of orderly arranged filter elements.

Gas filters of the reuseable type functioning by means of the development of an electrostatic charge are known and disclosed by Nicol in U. S. Patent 2,612,966, describing the use of polyethylene elements as the essential filtering medium and by Endres in U. S. Patent 2,597,927, describing the use of rubber hydrochloride elements as the essential filtering medium. Under certain conditions of use, it has been found that the filter elements of the prior art filters have a tendency to be moved out of position, thereby affecting the filtering characteristics of the filter to the extent that it becomes less reliable with constant use.

It is important that commercial filters of the reuseable type retain their filtering characteristics throughout their life, particularly with regard to resistance to the flow of air therethrough, the even distribution of the flow of air therethrough, and the efficiency of the filter after it has been regenerated for further use.

It has now been discovered that these important properties of a filter are assured when the filtering elements are arranged in an orderly manner in a plurality of layers. More specifically, these properties are assured when the orderly arranged elements are cooperatively interconnected in at least one layer and preferably in each layer.

The invention will be more readily understood by reference to the following more detailed description when considered in connection with the accompanying drawing, in which.

Figure 1:
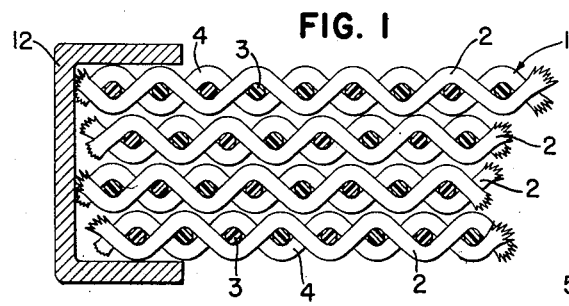
Fig. 1 is an enlarged fragmentary view partly in cross section, showing one embodiment of the present invention.

The filter of this invention is composed of a plurality of plies or layers of orderly arranged elements cooperatively interconnected to form a gas pervious mat 1 as shown in Fig. 1. In this particular embodiment each of the layers 2 is composed of strands 3, shown in cross section, interwoven with strands 4 to form a screen having square openings determined by the spacing of the strands 3 relative to each other and the spacing of strands 4 relative to each other. The strands may also be woven relative to each other in such a way as to form diamond-shaped openings or octagonal openings.

The diameter of the strands 3 and 4 may vary anywhere from normal screen size of .015" to a relatively small size of .006" to an ultra fine size of 1 micron or .000039". The size of the opening is determined in large part by the diameter of the strands used and mesh openings are generally of the same value as is the diameter of the strands used in making the screen. The smaller the diameter size, the finer is the mesh of the screen and consequently the more effective becomes the filtering action in regard to small size particles of the order of a few microns.

It is desirable to arrange each layer of interwoven strands in such a way that the openings are not in axial alignment, thereby presenting a homogeneous honeycomb maze to the passage of a dust particle through the filter. The establishment of the homogeneous honeycomb maze permits the even flow of gas through the filter at a pressure drop which is substantially the same throughout the filtering area of the filter. This preferred arrangement of the layers of the woven strands also insures the contact of a dust particle with at least one strand in its attempt to pass through the filter. This insured contact arrangement of the strands improves the filtering efficiency, particularly when filtering ultra fine particles of dust in the order of from .01 to 10 microns in diameter.

Figure 2:
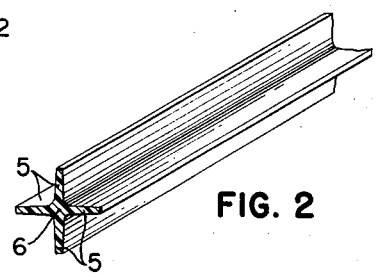
Fig. 2 is an enlarged perspective view showing a modified strand that may be used in the construction of a layer of the filtering elements of this invention.
Figure 3:
Fig. 3 is a plan view showing the strand of Fig. 2 twisted to form a plurality of helical flutes.

The strands used in making the woven layers shown in Fig. 1 are circular in cross section, forming cylindrical strands having a relatively smooth contact surface. These strands, however, may be of a different cross section, as is shown, for example, in Figs. 2, 4, 5 and 6. Fig. 2 shows a strand in the form of a cross in cross section having four ribs, fins or vanes 5 of equal width and extending radially from a longitudinal axis 6 in such a way that each vane is disposed at right angles to each adjacent vane. This strand is then twisted to form helical flutes, grooves or channels 7 throughout the length of the strand 8 as shown in Fig. 3. Thus, the finished element comprises vanes 5 extending radially from the longitudinal axis 6 with each vane being disposed in a separate helical longitudinally extending plane passing through said axis.

Figures 6, 8:
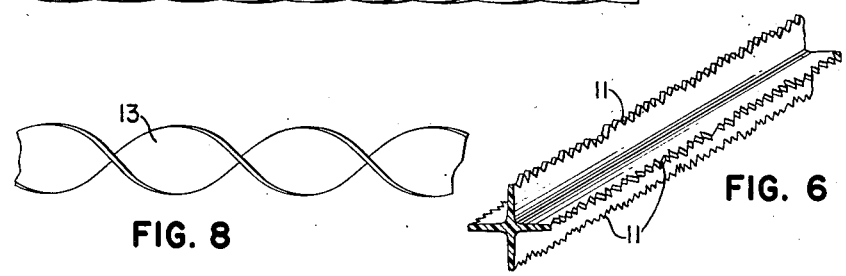
Fig. 6 is a plan view of a portion of a strand having an irregular leading edge on each of the vanes of the strand.
Fig. 8 is a plan view showing a double fluted strand.
Figure 4:
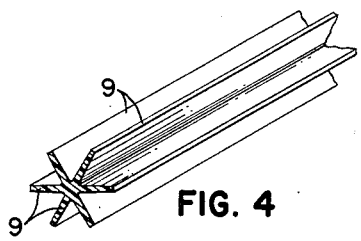
Fig. 4 is a perspective view showing a further modified strand that may be used in the construction of a layer of filtering elements for this invention.
Figure 5:
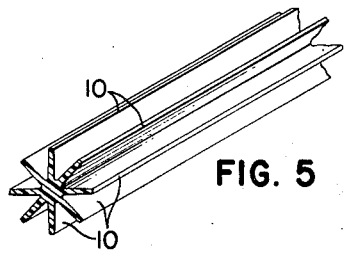
Fig. 5 is a perspective view showing a still further modified strand that may be used in the present invention.

Other strands having modified cross sectional shapes may be used, including one having six equally spaced vanes 9 of equal width as shown in Fig. 4, and one having eight equally spaced vanes 10 of equal width as shown in Fig. 5. A strand 13 having a rectangular cross section may also be used to form a double fluted element as shown in Fig. 8. These strands are twisted in the manner described for the strand of Fig. 2 to form elements having a correspondingly greater number of helical flutes in the strand than is shown in Fig. 3. The vanes 5, 9, 10 and 13, shown in Figs. 2, 4, 5 and 8, respectively, may be modified by providing a plurality of discharge points 11 on the leading or free edge of the vane, as shown in Fig. 6.

Figure 7:
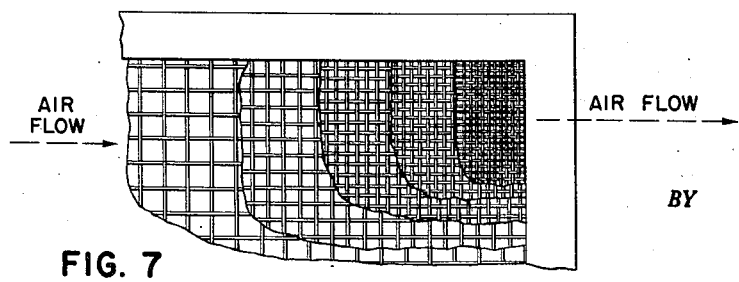
Fig. 7 is a fragmentary enlarged plan view with parts broken away showing a plurality of layers of filtering elements having different mesh openings arranged in progressively diminishing size relation.

The layers of woven strands may all be of the same mesh opening or may be of a different mesh opening, and preferably of an increasingly smaller mesh opening, as shown in Fig. 7. In this manner the coarser particles of dust are removed on the upstream side of the filter, whereas the finer dust particles are removed by the layers of finer mesh toward the downstream side of the filter. More than one layer of the woven strands having the same size mesh openings may be assembled into a unit of layers. A number of units may be assembled into a filter mat in which the openings in a layer of one unit are smaller than the openings in a layer of a unit on one side of said one unit and larger than the openings in a layer of a unit on the other side of said one unit.

The strands used in the preparation of the filtering layers of this invention may be made of any organic material capable of developing an electrostatic charge when gas is passed thereover. Examples of organic material that may be used, listed in the order of their preference, include polyethylene, polystyrene, polamides, rubber hydrochloride, polymeric ethylene terephthalate, and polyacrylonitrile.

When the layers of filtering material used in the present invention are made from strands having one or more longitudinally extending helical flutes, the path of the air stream through the filter is deflected by virture of these flutes in such a way that the dust particles become detached from the air stream and deposited on the strands due to the sharp deflection of the air stream as it strikes against these fluted surfaces. Other dust particles are removed from the air stream when they come into direct contact with the surface of the strands. Still other particles are removed from the air sream by virtue of the electrostatic charge developed on the surface of these strands which attracts the dust particles to the surface of the strand. All three of these effects combine to produce an efficient filter.

The layers of woven strands of, for example, polyethylene, may be positioned inside of a suitable frame 12 as shown in Fig. 1. The layers may be anchored relative to each other at their outer edges in any suitable manner, as for example by means of a bonding agent not shown, or by means of a mechanical binding agent such as a strand of like material or dissimilar material threaded through the layers, or by means of a staple of sufficient length to hold the layers in assembled relationship to each other. The heat sealable strands may be fused together at their edges one to the other by heat applied at the outer edge of the layers under pressure.

Filters constructed in this manner and made particularly of polyethylene, can be readily regenerated by immersion in water containing a detergent without disrupting the orderly arrangement of the elements by virtue of the cooperatively interconnected relationship of these strands in woven layers. The filter may contain as few as three layers of the woven elements up to as high as 8, 12, 16 and 24 layers, depending, of course, upon the amount of filterable material per unit volume of air to be removed per unit time and the pressure drop that may be developed in the air conditioning system in which the filter is to be used.

While certain representative embodiments and details have been shown for the purpose of illustrating the invention, it will be apparent to those skilled in this art that various changes and modifications may be made therein without departing from the spirit or scope of the invention.

I claim:

In a gas filter of the type comprising a gas pervious mat, an improved mat comprising superposed layers of orderly arranged elongated elements of polyethylene capable of developing an electrostatic charge when a gas is passed thereover, each of said elements being in the form of a strand having a smooth surface and being circular in cross section having a diameter selected from the range .015" to .000039", the strands being interwoven relative to each other to form passageways bounded on at least four sides by said strands and to form one of said layers, the passageways being out of axial alignment with the passageways in an adjacent layer and being of increasingly smaller opening in each succeeding layer.

References Cited in the file of this patent

UNITED STATES PATENTS

| | | |
|---|---|---|
| 326,176 | Van Gelder | Sept. 15, 1885 |
| 1,056,722 | Adler | Mar. 18, 1913 |
| 1,574,422 | Feind | Feb. 23, 1926 |
| 2,266,631 | Francis | Dec. 16, 1941 |
| 2,355,822 | Rugeley | Aug. 15, 1944 |
| 2,425,235 | Ferrante | Aug. 5, 1947 |
| 2,516,340 | Pirchio | July 25, 1950 |
| 2,612,966 | Nicol | Oct. 7, 1952 |
| 2,619,188 | Haw et al. | Nov. 25, 1952 |
| 2,634,671 | Puidokas | Apr. 14, 1953 |